(12) United States Patent
Hummell et al.

(10) Patent No.: US 6,412,889 B1
(45) Date of Patent: Jul. 2, 2002

(54) ORGANIZER FOR COMPUTER MONITOR

(75) Inventors: Michael Hummell, Newport Beach;
Joseph Sandor, Corona Del Mar;
Kenneth Holowatch, Aliso Viejo;
Kevin Topp, Siliverado, all of CA (US)

(73) Assignee: Stomp, Inc., Costa Mesa, CA (US)

( * ) Notice: Subject to any disclaimer, the term of this patent is extended or adjusted under 35 U.S.C. 154(b) by 0 days.

(21) Appl. No.: 09/538,251

(22) Filed: Mar. 29, 2000

(51) Int. Cl.$^7$ ............................................. A47B 81/06

(52) U.S. Cl. ................... 312/9.53; 312/271; 312/348.1; 248/447.2; 248/918

(58) Field of Search ................................. 312/107, 108, 312/109, 111, 198, 246, 271, 348.1, 348.3, 223.3, 223.6, 9.53; 248/176, 278, 442.2, 447.2, 448, 451, 918; 211/88, 126, 96, 205.3; 206/45.14

(56) References Cited

U.S. PATENT DOCUMENTS

| | | |
|---|---|---|
| 498,974 A | 7/1893 | Harkinson |
| 2,604,369 A | 7/1952 | Phillips et al. |
| 2,615,776 A | 10/1952 | Lorentzen |
| 3,195,736 A | 7/1965 | Bomar, Jr. |
| 3,285,685 A | 11/1966 | Hewett |
| 3,337,059 A | 8/1967 | Hoy |
| 3,717,395 A | 2/1973 | Spielvogel et al. |
| 4,171,760 A | 10/1979 | Gay |
| 4,442,960 A | 4/1984 | Vetter |
| 4,491,375 A | 1/1985 | Ugalde |
| D278,493 S | 4/1985 | Brescia et al. |
| 4,580,706 A | 4/1986 | Jackson et al. |
| 4,582,285 A | 4/1986 | Bello |
| 4,619,429 A | 10/1986 | Mazza |
| 4,651,872 A | 3/1987 | Joyce |
| 4,657,214 A | 4/1987 | Foster |
| 4,728,158 A * | 3/1988 | D'Elia et al. ............... 312/108 |
| 4,747,572 A | 5/1988 | Weber |
| 4,767,093 A | 8/1988 | Jones |
| 4,846,430 A | 7/1989 | Ke |
| 4,902,078 A | 2/1990 | Judd |
| D316,275 S | 4/1991 | Davis et al. |
| 5,022,537 A | 6/1991 | Henriquez |
| 5,101,987 A | 4/1992 | Twedt |
| 5,104,087 A | 4/1992 | Wentzloff et al. |
| 5,104,088 A | 4/1992 | Bakanowsky, III |
| 5,122,941 A | 6/1992 | Gross et al. |
| 5,125,612 A | 6/1992 | McNeal |
| 5,161,767 A | 11/1992 | Hansen |
| 5,161,870 A | 11/1992 | Mason et al. |
| 5,205,631 A | 4/1993 | Wegman et al. |
| 5,213,401 A | 5/1993 | Hatcher |
| D336,197 S | 6/1993 | Wilcox |
| 5,292,099 A | 3/1994 | Isham et al. |
| 5,301,915 A | 4/1994 | Bahniuk et al. |

(List continued on next page.)

FOREIGN PATENT DOCUMENTS

| | | |
|---|---|---|
| DE | 2056775 | 5/1972 |
| EP | 181196 | 5/1986 |
| EP | 599451 | 6/1994 |

*Primary Examiner*—Peter M. Cuomo
*Assistant Examiner*—Michael J. Fisher
(74) *Attorney, Agent, or Firm*—Walter A. Hackler

(57) ABSTRACT

An organizer for orientation of desk top items includes a frame, having a front, back and two sides, for receiving a plurality of modules, orienting the modules vertically within the frame between to two sides and enabling access to the modules from the frame front and a plurality of modules and a bracket for attaching one of the frame sides to a generally vertical surface. The bracket includes a body for engaging the frame, a bendable tab extending from a top of said body for attaching said body to a top of the computer monitor, and a rear tab, hingeably attached to a rear of said body, for attaching said body rear to a side of the computer monitor, the hingeable attachment enabling stabilization of the body rear at a spaced apart relationship with the computer monitor side. One of the modules may include interface connections for contact with a computer.

81 Claims, 10 Drawing Sheets

U.S. PATENT DOCUMENTS

| | | | |
|---|---|---|---|
| 5,398,905 A | | 3/1995 | Hinson |
| D357,008 S | | 4/1995 | Pohlman |
| 5,416,666 A | * | 5/1995 | Maguire, Jr. ......... 312/223.3 X |
| 5,476,172 A | | 12/1995 | Hunt et al. |
| 5,505,421 A | | 4/1996 | Marthaler |
| 5,564,209 A | * | 10/1996 | Zagnoli .................. 248/918 X |
| 5,588,727 A | | 12/1996 | D'Agaro et al. |
| 5,589,985 A | | 12/1996 | Heller et al. |
| 5,590,827 A | | 1/1997 | Nimpoeno |
| 5,595,309 A | | 1/1997 | Bauer et al. |
| 5,615,854 A | | 4/1997 | Nomura et al. |
| 5,628,436 A | | 5/1997 | Jones et al. |
| D381,947 S | | 8/1997 | Bergh et al. |
| 5,664,673 A | * | 9/1997 | Perry .................... 248/918 X |
| 5,672,105 A | | 9/1997 | Curic |
| 5,678,792 A | | 10/1997 | Arguin et al. |
| 5,683,070 A | | 11/1997 | Seed |
| 5,687,945 A | | 11/1997 | Lee |
| D389,000 S | | 1/1998 | Etingin |
| 5,738,320 A | | 4/1998 | Matos et al. |
| D394,879 S | | 6/1998 | Carbonaro |
| D395,293 S | | 6/1998 | Kirby |
| 5,759,644 A | | 6/1998 | Stanley |
| 5,762,246 A | | 6/1998 | Drew |
| 5,769,378 A | | 6/1998 | Correa |
| D398,471 S | | 9/1998 | Malik |
| 5,806,693 A | | 9/1998 | Carbonaro |
| 5,813,539 A | | 9/1998 | DePalma |
| 5,860,550 A | | 1/1999 | Miller et al. |
| 5,901,937 A | | 5/1999 | Compeau et al. |
| 5,906,348 A | | 5/1999 | Orenstein |
| 5,988,582 A | | 11/1999 | Olivo |
| 5,996,786 A | | 12/1999 | McGrath |
| 6,100,942 A | * | 8/2000 | Hollenbaugh et al. .. 248/918 X |
| 6,108,198 A | * | 8/2000 | Lin ..................... 312/223.3 X |

* cited by examiner

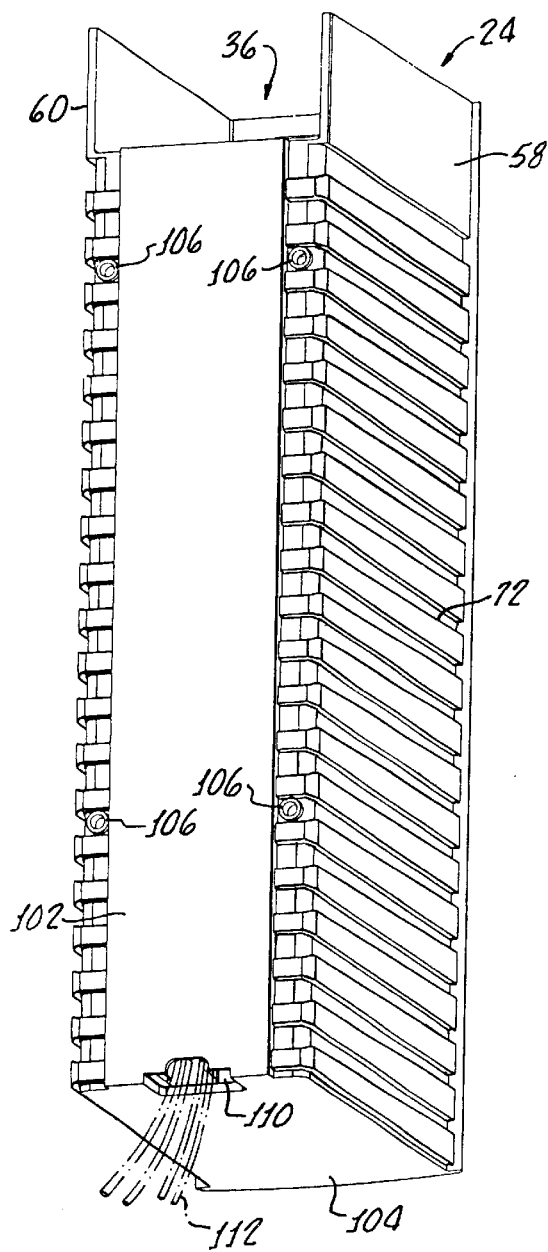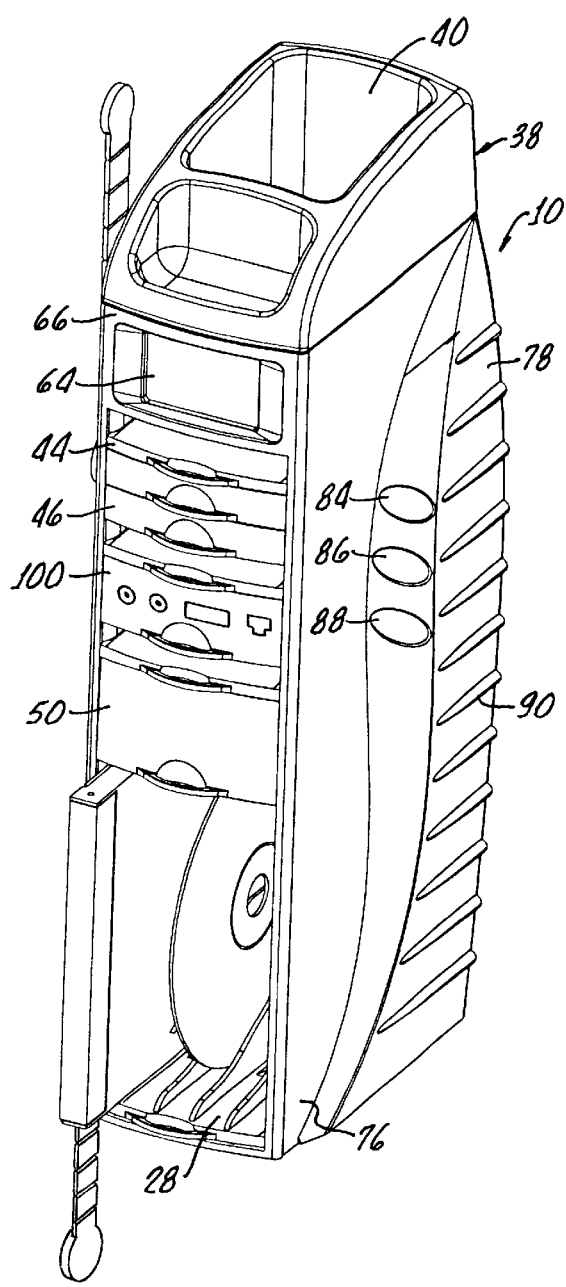

ORGANIZER FOR COMPUTER MONITOR

The present invention most generally relates to apparatus for orientation of desktop items.

More particularly, the present invention is directed to an organizer for the vertical orientation of desktop items along side of a computer monitor.

Modern office and home work stations typically include a personal computer along with a monitor, keyboard and a printer.

Such a personal computing system can take up a considerable amount of desktop space and accordingly reduce the space available for other desk type items which includes pencils, paper clips, along with compact floppy disks for use with the computer to name a few. Further limiting useful desktop space are corporate environments which allot workers into partitioned cubicles in order to save overhead. Consequently, with the space in the typical cubical at a premium, organization of desktop items can not only conserve space but, with appropriate organization, can make such items readily available to the worker.

Any number of organizers have been proposed which are designed to save space and increase visual appearance or increase office efficiency. Many of these devices are directed to attach to a computer monitor in view of its close proximately to the worker. This provides for ready access thereto which is well within the worker's reach and line of sight.

The majority of such organizers have been directed to the use of clipboards which when mounted to a side of a monitor, enables visual perception of both the clipboard and items thereon and the monitor screen by the user.

Other devices provide for the attachment of bins or the like for the holding of miscellaneous desktop items.

Unfortunately, while previous devices have made an effort towards saving space by providing various organizing concepts, they have fallen short of providing an organizer for the user which can be maximized depending upon the users needs.

None of the prior art devices have provided an organizer for all desired office paraphernalia as well as computer related accessories such as compact disks and floppy disks.

SUMMARY OF THE INVENTION

The present invention is directed an organizer for the orientation of desktop items and generally includes a plurality of different-sized modules. The modules are of different sizes in order to accommodate different desk top items. A frame having a front, back and two sides is provided for receiving the plurality of modules, orienting the modules vertically within the frame between the two sides and enabling access to the modules from the frame front. The modules are replaceable within the frame and interchangeable to different positions, relative to one another, within the frame.

A bracket may be provided for attaching one of the frame sides to a generally vertical surface. The vertical surface may be the side of a computer, particularly a tower computer, but preferably the vertical surface includes a computer monitor side. This provides for disposing the modules within easy reach and view of the user.

In order to accept a miscellaneous variety of desktop items, the organizer may include at least one module which is a shelf, preferably slidably between the two sides of the frame.

The frame may include an open top in the organizer, and a module sized for insertion into the frame open top, may be provided for supporting a cup, mug or the like.

At least one of the modules may also comprise spaced apart slots for receiving compact disk (CD) cases or floppy disks. The slotted modules may include grooves in the bottom of the module between the slots for stabilizing CD (without cases) within the slots.

The frame sides may include inside parallel grooves for receiving the modules and enable their insertion and removal from the frame and also for enabling the user to place or insert the modules within the frame in any particular order.

An opening in the frame front may also be provided for receiving and displaying a photograph.

According to another embodiment, the present invention is directed to an organizer for orientation of desktop items alongside a computer monitor, the organizer including a frame having a front, back, left- and right-hand sides, a bracket for mounting the frame with one of the left- and right-hand sides abutting a side of the computer monitor, the frame front being generally parallel to the screen of the computer monitor, and a plurality of modules configured for being removably inserted into the frame in an orientation enabling access to the modules from the front of the frame.

To further integrate the organizer, in accordance with the present invention, with the computer, at least one of the modules may include a front and at least one computer input receptacle may be disposed in the module so as to be accessible from the module front. Means are provided for connecting the input receptacle to the computer. In this manner various input connector receptacles, such as USB connectors and fill telephone jacks may be accessed through the use of the organizer in accordance with the present invention. This provides a great convenience to the user who would otherwise need to access such input receptacles from the back of the computer which involves a hunt and seek procedure because of the mass of wires typically present there.

Another embodiment of the present invention is directed to a computer monitor accessory including a module having a front, at least one computer receptacle disposed in the module and accessible from the module front, means for connecting the input receptacle to a computer, and a frame for supporting the module alongside a computer monitor, with the module front disposed in a plane generally parallel to a screen of the computer monitor, the frame having a bracket for attaching the frame to the computer monitor.

In addition, one of the modules may comprise a speaker, thus eliminating the need for positioning such speakers at other locations on the user's desk or work area.

The frame sides may also include parallel outside grooves for receiving accent panels. A plurality of accent panels may include ribs for slidably engaging the outside grooves of the frame side, thus providing an attractive outside appearance for the organizer. In addition, one of the accent panels may include openings therein for the support of pens or pencils, thus insuring a readily access thereto by the user.

Each of the modules may include biasing elements for stabilizing the modules between the frame side inside grooves. Accordingly, removal of the modules from their frame requires overcoming a small drag force provided by the biasing elements and this in turn insures secure the positioning of the modules within the frame.

Because certain of the modules may include input receptacle and speakers, a wire passageway is provided along inside of the frame back. Thus the overall appearance of the organizer is not disrupted by the observation of interconnecting of computer wires.

If separately purchased speakers are utilized or larger items are to be attached to the organizer, a shelf may be provided which includes ribs for engaging parallel grooves of the outside frame to support the shelf in a generally horizontal position while extending outwardly from the frame side. The shelf may be of various sizes and is suitable for the placement of any appropriately sized item such as a computer speaker.

According to yet another embodiment of the invention, a bracket assembly is provided for attaching one of the frame sides to a generally vertical surface, such as the side of the computer monitor, where the bracket assembly generally includes a body having means for engaging the frame along with a bendable tab extending from a top of the body for attaching the body to a top of the computer monitor. A rear tab, hingeably attached to a rear of the bracket body, is provided for attaching the body rear to the side of the computer monitor with the hingeable attachment enabling the stabilization of the body rear in a spaced apart relationship with the computer monitor side. This unique bracket configuration enables the organizer to be attached to almost all currently available monitor shapes and sizes.

To provide further stability, the bracket may include a second flexible tab extending from a bottom of the body for attaching the body to a bottom of the computer monitor.

Preferably, the body is a flat elongate member and the means for engaging the frame comprises a plurality of spaced-apart ribs disposed along one side of the flat elongate member and extending approximately perpendicular to a longitudinal axis of the flat elongated member. These ribs engage the outside grooves on the frame sides.

Importantly, the use of top and bottom tabs along with the hingeable rear tab enables the bracket to install the organizer on either the right or left hand side of a computer monitor. More particularly, the bracket may include at least one adherent member, such as a contact adhesive, or Velcro, disposed below the bendable top pad on an opposite side of the flat elongate member surface for adhering the flat elongate member to the side of the computer monitor. In addition, an adherent member, hingeably attached to the rear tab on an end thereof opposite the hingeable attachment to the body rear, is provided for adhering the rear tab to the computer monitor rear.

BRIEF DESCRIPTION OF THE DRAWINGS

A better understanding of the present invention and the features and advantages attendant thereto, will be accomplished upon consideration of the following detailed description when taken in conjunction with the accompanying drawings in which;

FIG. 5 is a perspective view of an assembled organizer including various modules;

FIG. 6 is a perspective rear view showing the frame having an open top along with the outside grooves on the frame sides as well as an opening in the frame bottom for passage of wire there through;

DETAIL DESCRIPTION

Figure 1:
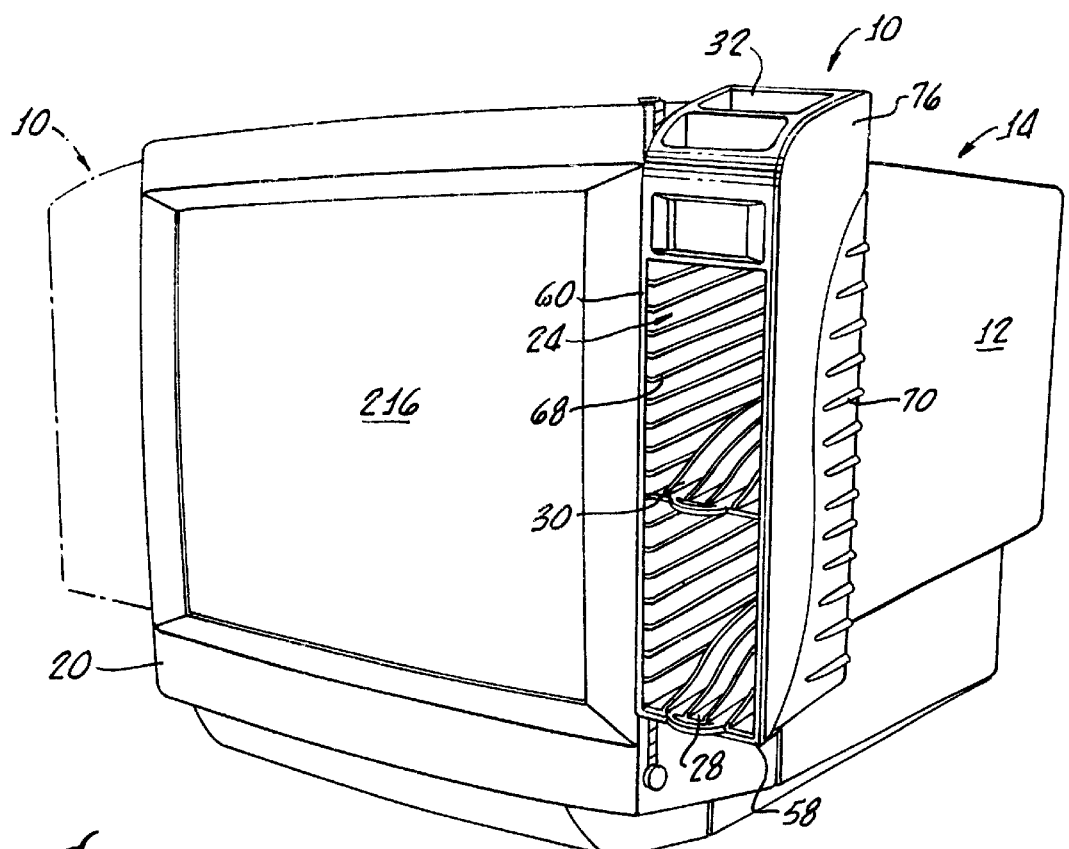
FIG. 1 is a perspective view of an organizer in accordance with the present invention as it may be attached to a right side of a computer monitor, a dashed line showing an alternative mounting of the organizer on a left side of the computer monitor.

With reference to FIG. 1, there is shown an organizer 10 as it may be attached to a right-hand side 12 of a computer monitor 14. As will be hereinafter discussed in greater detail, a bracket 18, see FIGS. 2, 3, also enables the attachment of the organizer 10 to a left-side 20 of the monitor 14, the organizer 10 on the left-side 20 on the monitor 14 being shown in dashed-line in FIG. 1.

The organizer 10 includes a frame 24, the bracket 18 along with slidable modules 28, 30 and top module 32 all of which may be molded from any suitable material such as plastic or the like.

It should be noted that the brackets indicated at 18A and 18B are in fact the same bracket shown in different positions for mounting the frame 24 to the right-side 12 or the left-side 20 of the monitor 14 as will be hereinafter discussed in greater detail.

Figure 3:
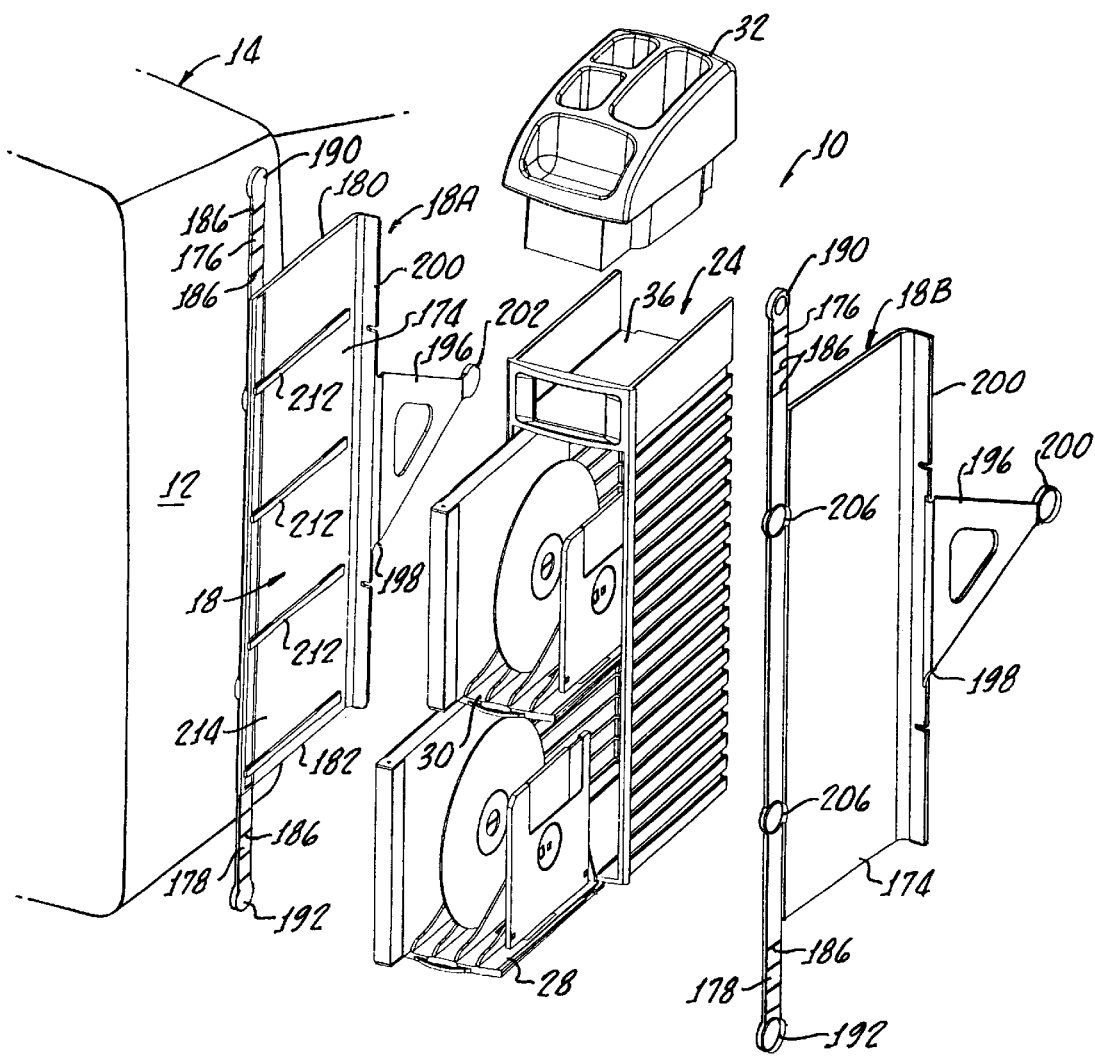
FIG. 3 is an exploded view of the organizer in accordance with the present invention, generally showing a frame and various modules along with a top module and both sides of a bracket for enabling the frame to be mounted on either side of the computer monitor.
Figure 4:
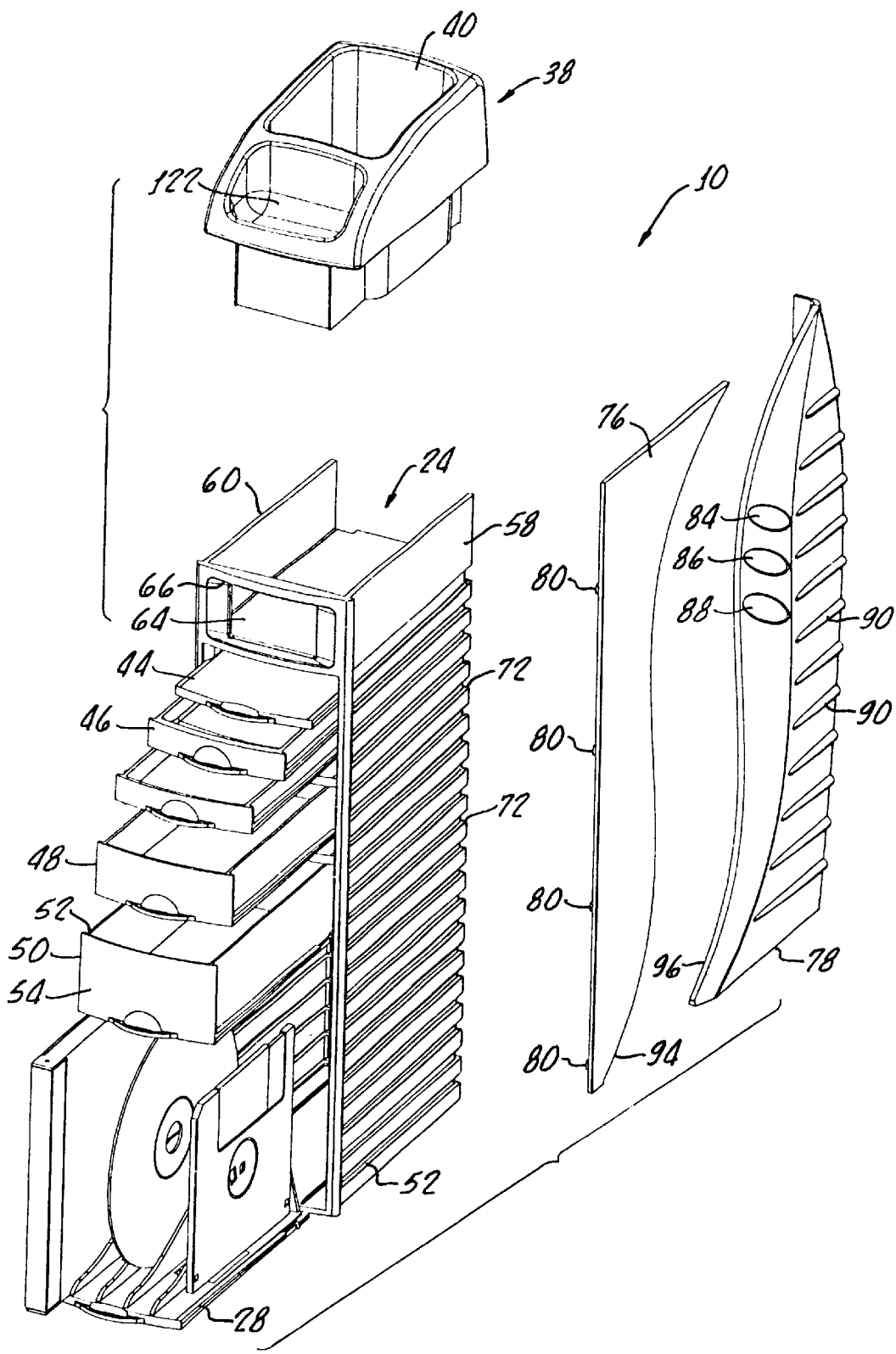
FIG. 4 is an exploded view of the organizer shown in FIG. 3, along with parallel outside grooves disposed in the frame sides for accepting accent panels and other accessories.

With reference to FIGS. 1 and 3, the frame 24 may include an open top 36 for receiving the top module 32, 38 (see FIG. 4), the top module 38 including a cavity 40 for supporting a cup, not shown. Also shown in FIG. 4 are shelf modules 44, 46 as well drawer modules 48, 50 along with the slotted module 28. It should also be appreciated that any of the drawer modules 48, 50 may include a hinge 52 at front 54 to enable access to the module without a sliding of the module from between sides 58, 60 of the frame 24.

An opening 64 in a frame front 66 may be provided for receiving and displaying a photograph (not shown).

As shown in FIG. 1, the frame 24 includes parallel inside grooves 68 in the frame sides 58, 60 for receiving the modules 28 and 30 in a slidable fashion. The inside grooves 68 are recessed in order to provide a uniform appearing thickness of the frame sides 58, 60 as shown in the figures.

Figure 2:
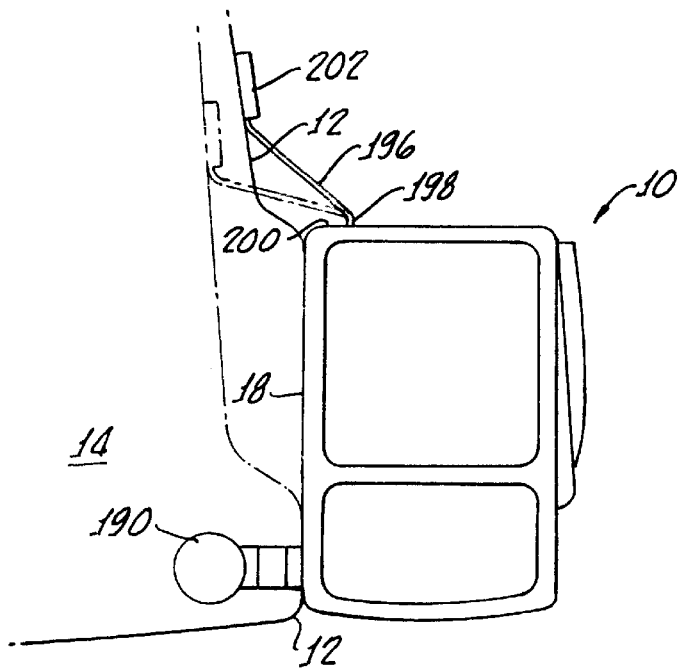
FIG. 2 is a top view of the organizer shown in FIG. 1 illustrating the ability of the bracket in accordance with the present invention for attaching the organizer frame to various computer monitor shapes, compare the attachment to one computer monitor shown in solid line and another computer monitor shown in dashed line.

The bracket assembly as depicted in FIGS. 2 and 3 will be discussed in greater detail below.

With reference to FIG. 4, the frame sides of 58, 60 may include parallel outside grooves 72 for receiving a plurality of accent panels 76, 78. The accent panels 76, 78 are provided with ribs 80 for slidably engaging the outside grooves 72 of the frame sides 58, 60.

As shown in FIG. 4, the accent panel 78 may have molded therein a plurality of openings 84, 86, 88 of supporting pens or pencils, not shown. Further the accent panels 78, 78 may be of different color than the frame 24 and include molded decretive designs 90 as well as contoured mating perimeters 94, 96 to provide a decretive organizer 10 as generally shown in FIGS. 1 and 5.

FIG. 5 depicts the organizer 10 of FIG. 4 in an assembled state. An interface module 100 which will be described hereinafter in greater detail, is also shown in FIG. 5. It must be appreciated that any of the modules 44, 46, 48, 50, 100 may be utilized in any combination and in any order to satisfy the needs of the user. All of these modules 44, 46, 50, 100 are easily removed and replaced by a sliding thereof in the inside groove 68.

FIG. 6 is a perspective view of the frame 24 showing a back 102 and a bottom 104 along with screws 106 which may be provided for attaching further accessories, not shown to the frame 24. An opening 110 formed in the frame back 102 and bottom 104 is provided for the passage of wires or cables 112 there through which may originate from the interface module 100 and which may be connected to corresponding connections of a computer.

Figure 7:
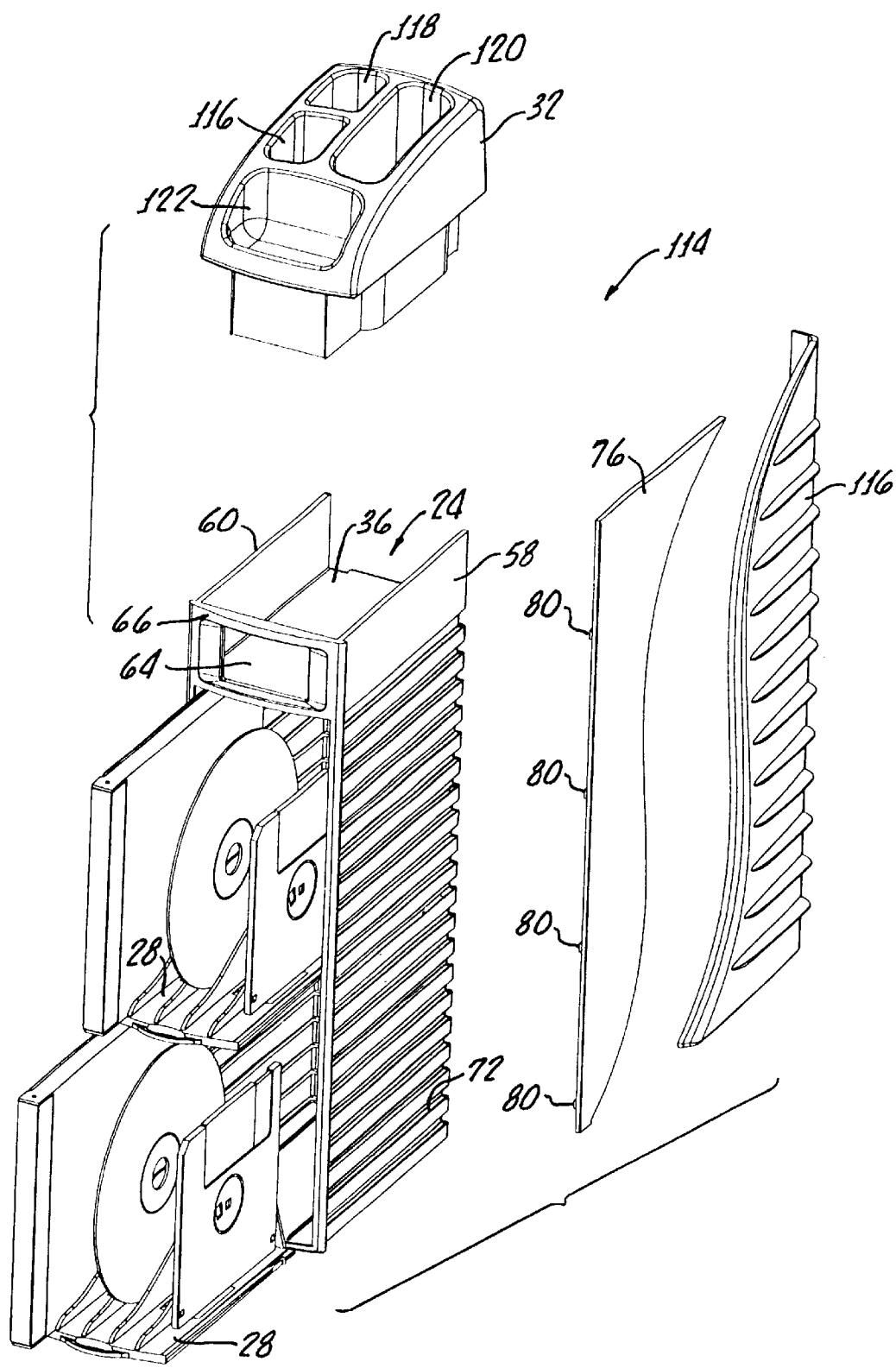
FIG. 7 is an exploded perspective view of the organizer in accordance with the present invention showing the use of two slotted modules for storage of CD jewel cases, various CDs and floppy disks.

With reference to FIG. 7 there is shown an organizer 114 utilizing a different configuration of modules 28 with identical character references referring to identical or substantially similar components hereinbefore discussed. In this instance, the organizer 114 utilizes a decorative panel 116 without holes 84, 86, 88 and includes two slotted modules 28 which are utilized for receiving storing CD jewel case, various CDs and floppy disks.

The top module 32 includes deep opening 116, 118, 120 for holding pencils and the like and a shallow opening 112 for holding, for example, paper clips or the like.

Figure 8:
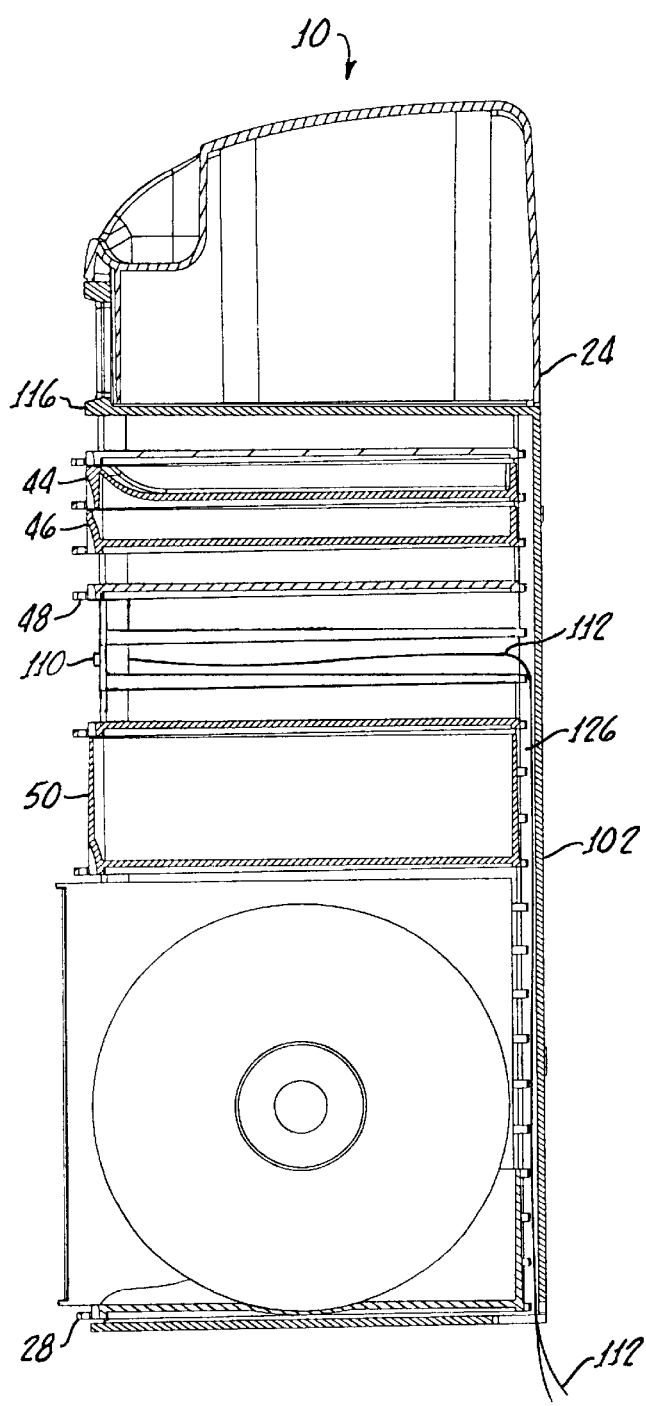
FIG. 8 is a cross-sectional view of the organizer as shown in FIGS. 4 and 5.
Figure 9:
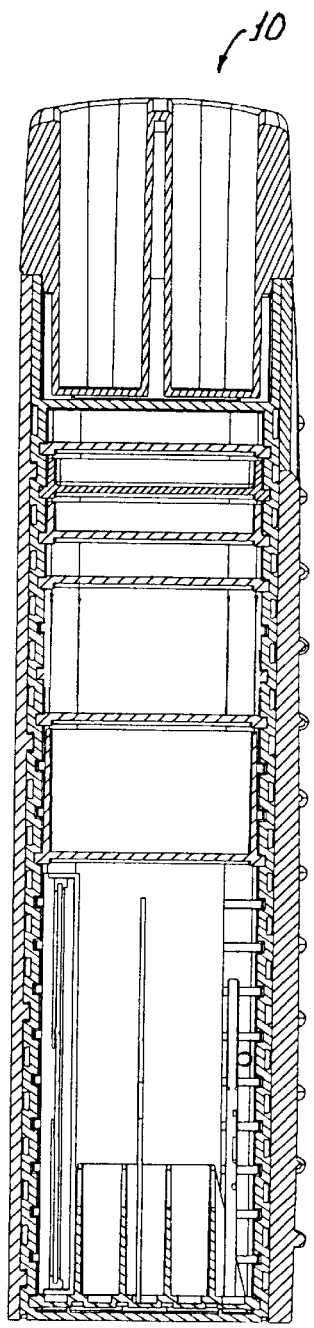
FIG. 9 is a front-back cross-sectional view of the organizer shown in FIG. 8.

FIGS. 8 and 9 are cross-sectional views of the organizer 10 shown in FIG. 4. As shown, the shelf module 44 includes an arcuate front bottom 116 for facilitating the removal of flat items such as pins, paperclips and the like. It should be appreciated that any drawer shelf configuration can be utilized in accordance with the present invention to tailor the organizer 10 to the needs of a user.

Figure 10:
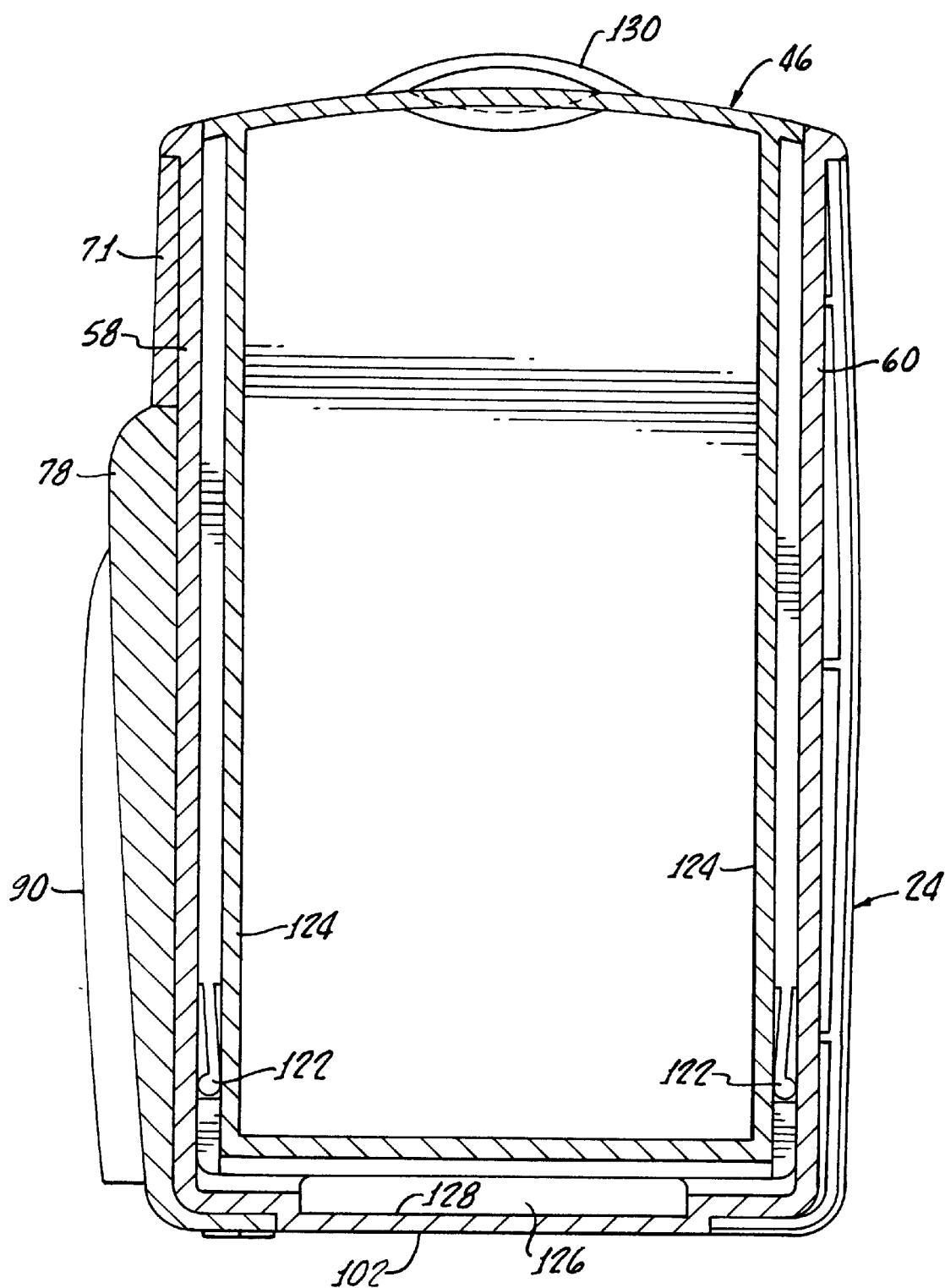
FIG. 10 is a plan cross-sectional view of the organizer showing a drawer module disposed therein along with biasing elements for stabilizing the drawer within the frame and a rear passageway for wires.

Also shown in FIG. 8 are wires 112 from the interface module 100 which pass through an opening 120 along the back of 102 the frame 24. With reference to FIG. 10 there is shown a cross-sectional view of the module 46 installed within the frame 24 between the sides 58, 60 thereof. As shown, biasing elements 122 which may be molded into the sides 124 along ribs 126 of the module 46 applying a stabilization force between the module 46 and the side walls 58, 60 in order to maintain the module 46 in a closed position. The ribs 126 engage the inside grooves 68 of the frame 24. Detents, not shown, may also be used to insure stability of the module 46 within the frame 24.

The biasing elements 122 are biased against sides 58 and 60 to provide a drag force which must be overcome in order to remove the module 46 from the frame 24. Also shown in FIG. 10 is a wire passageway 120 disposed along an inside of the frame back wall 102. A molded handle 130 facilitates the insertion and removal of the module 46 from the frame 24. A perspective view of the module 46 is shown in FIG. 11.

Figure 11:
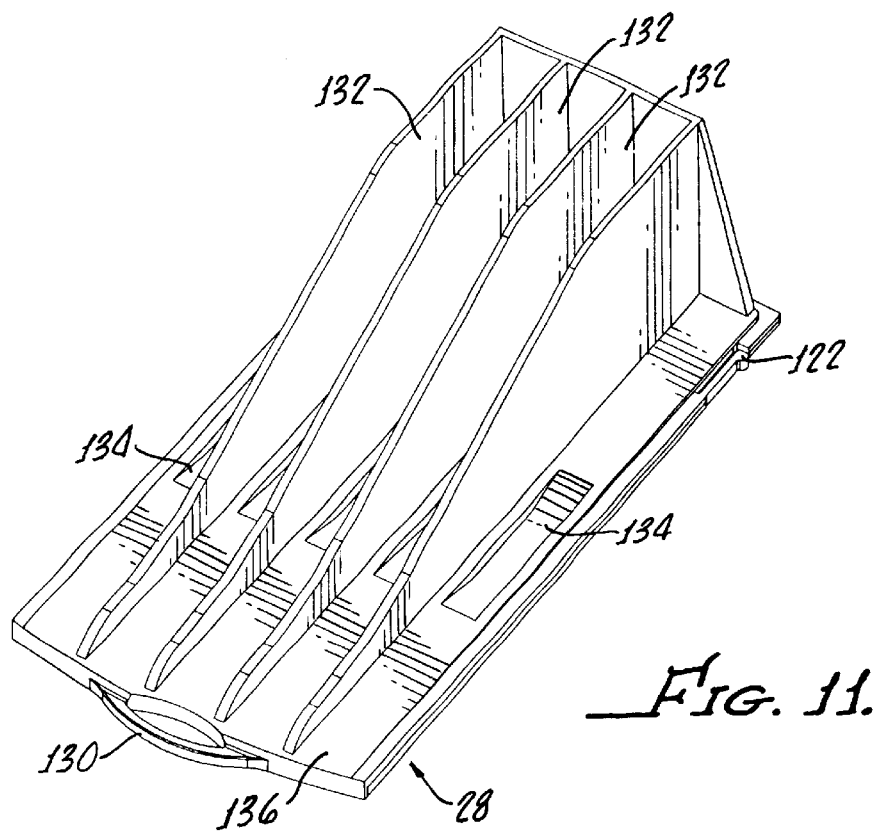
FIG. 11 is a perspective view of a module shelf in accordance with the present invention.
Figure 12:
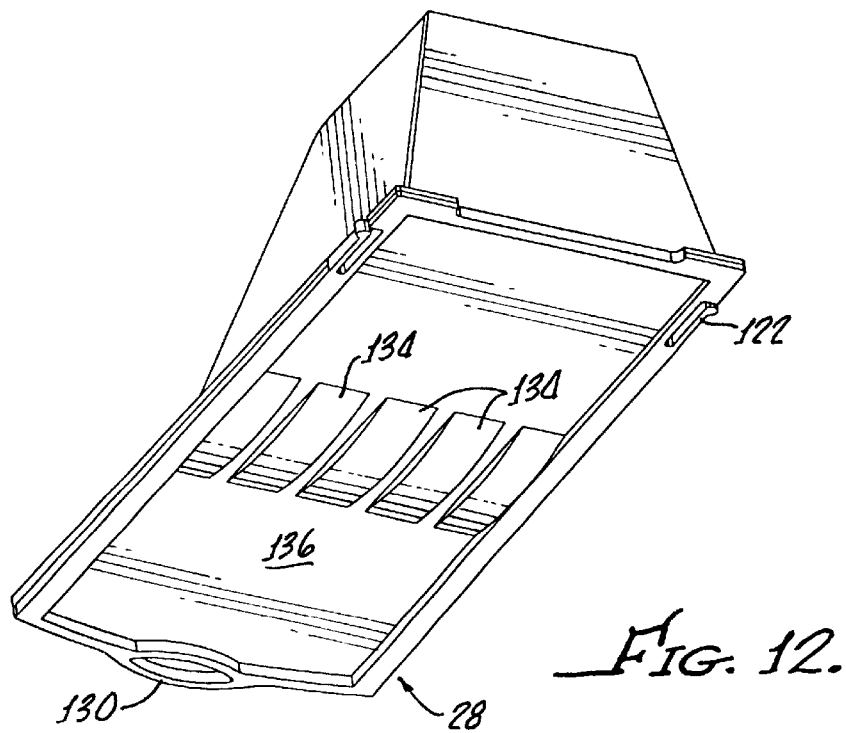
FIG. 12 is a perspective view of a module having slots and grooves therein for the storage of compact disk cases, various CDs, and floppy disks.
Figure 13:
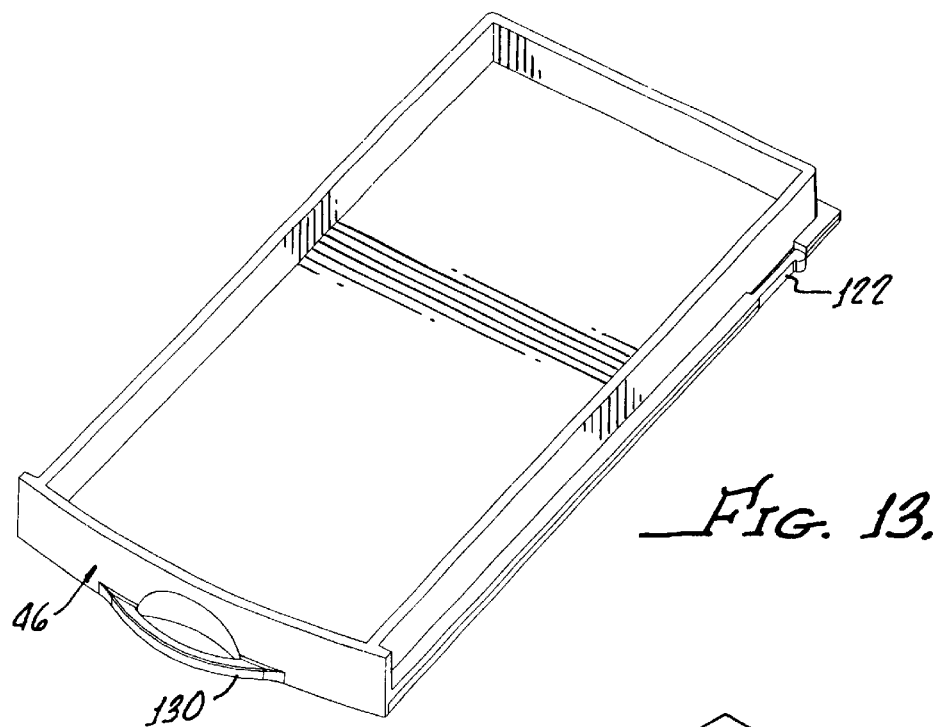
FIG. 13 is a perspective bottom view of the module shown in FIG. 11.

FIGS. 12 and 13 show respectively, module 28 which includes a plurality at spaced apart slots 132 for receiving and supporting CD cases or floppy disks, not shown in FIGS. 11, 12. In addition, grooves or depressions, 134 formed in a bottom 136 of the module 28 enable the stabilization of CDs without jewel cases not shown in FIGS. 11 and 12, to rest within the slots 132 while preventing the various CD's from rolling from between the slots 132.

Figure 14:
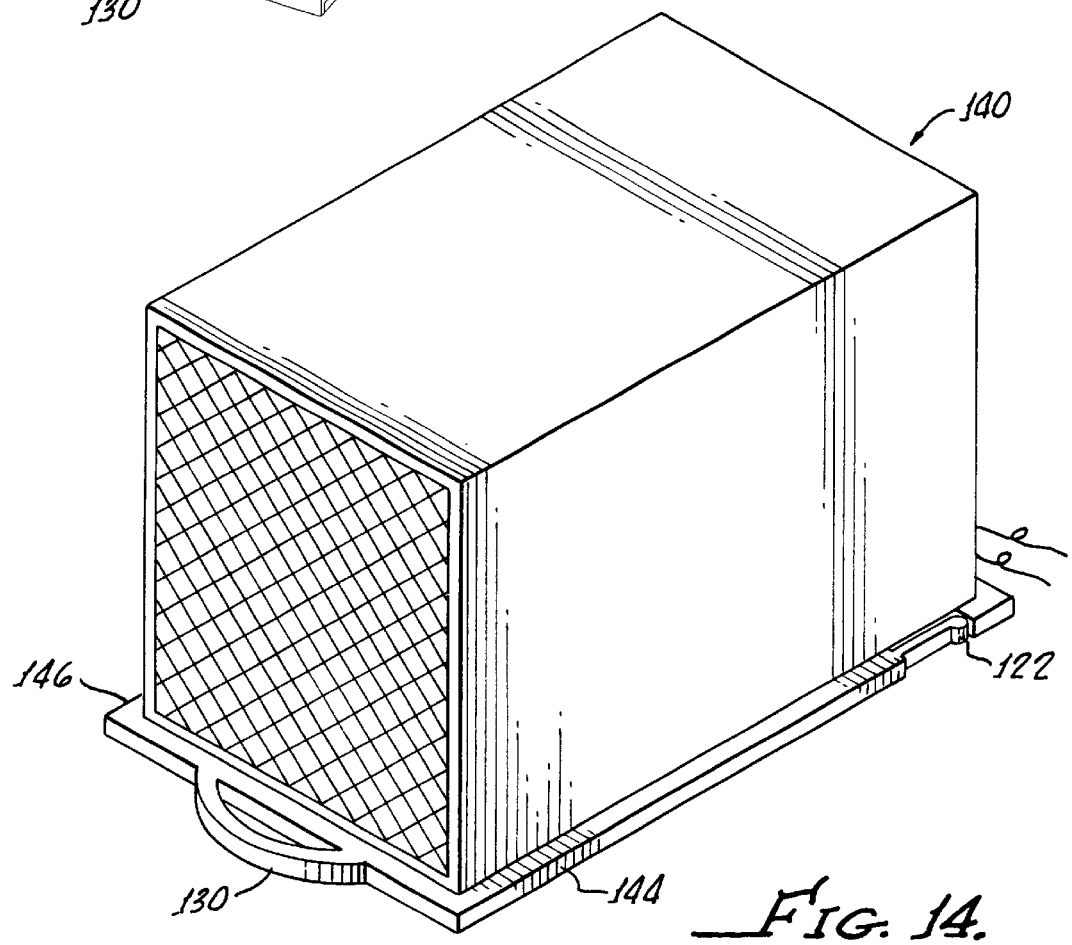
FIG. 14 is a perspective view of a speaker module suitable for insertion into the frame in accordance with the present invention.

FIG. 14 shows a speaker module 114 sized for inserting between the sides 58, 60 of the frame 24 by way of the ribs 144, 146 which slidable engage the inside grooves 68. Speaker module 114 thereby provides a speaker in organizer 10 in which the speaker may be connected to a computer, thereby reducing the need for desktop space for such speakers.

Figure 15:
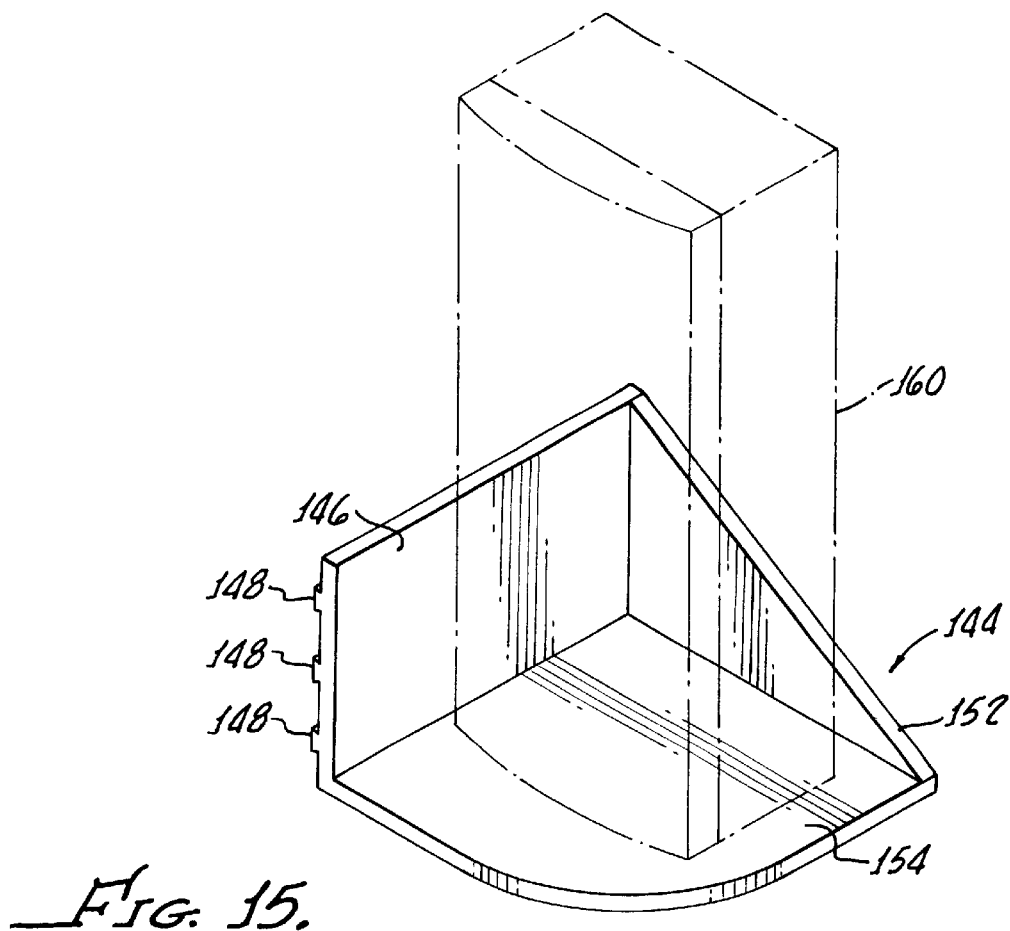
FIG. 15 is a perspective view of a shelf suitable for supporting a speaker, or item of similar size along the side of the organizer frame by means of ribs in an upstanding side of the shelf.

With reference to FIG. 15 there is shown a shelf module 144 which includes a sidewall 146 having ribs 148 for engaging outside grooves 72 of frame 24. A back wall 152 may provide further strengthening of a shelf deck 154 in order to support heaver items. Shelf module 144 thereby externally attached to frame 24. A speaker 160, shown in dashed line in FIG. 15 may be supported by the shelf module 144. Alternatively, any other similarly sized item, such as a cup or the like maybe disposed on the shelf deck 154 at the discretion of the user.

Figure 16:
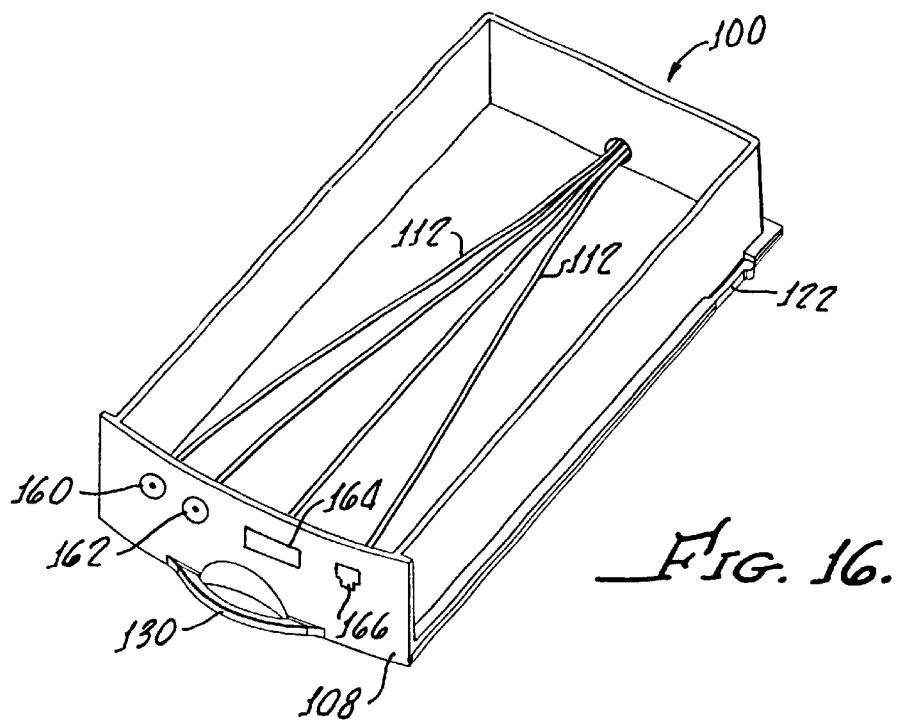
FIG. 16 is a perspective view of an interface module in accordance with the present invention generally including a front and at least one computer input receptacle, such as a USB connector or telephone jack, disposed in the module and accessible from the module front along with wires which may be utilized to inter-connect the various receptacles to suitable cooperating connection elements of the computer.

FIG. 16 is a perspective view of the interface module 100 generally showing a module front 158 and a plurality of phone jacks 160, 162 along with an input receptacle, such as a USB connector 164 and a telephone jack 166 provided in front 58. Wires 112 provide a means for connecting the jacks 160, 162, connector 164 and receptacle 166 to a computer, not shown, or other telephone or accessory device, also not shown. As discussed above, wires 112 can be routed through wire passageway 120 of frame 24 to facilitate hiding wires 112 which may be connected to a computer.

This interface module 100, which may be disposed in any position within the frame 24, provides an enormous advantage in that it puts computer connections to the front of the monitor for access by the user and thus reduces the heretofore necessity of groping to the back of the computer with a myriad of wires extending therefrom in order to find an appropriate input connection.

Referring back to FIGS. 1–3, the bracket 18, represented in FIG. 3 as 18A and 18B provides a means for attaching the frame 24 to the either the right-side 12 of the monitor 14 or the left-side 20 of the monitor 14 as hereinbefore noted.

As seen in FIGS. 2 and 3, the bracket 18 includes a body 174 with bendable tabs 176, 178 extending from top 180 and a bottom 182 of the body 174 respectively.

Flexibility of the tabs 176, 178 may by provided by notches or grooves 186 formed therein and ends 190, 192 may be provided with adhesive for attachment to the monitor top or bottom as shown in FIG. 1. A rear tab 196 is attached by way of a molded hinge, or the like, 198 to a rear 200 of the body 174. The rear tab 196 is itself rigid and a bendable tab 200 enables the rear tab 196 to be adhered to a computer monitor 14 with the body rear 200 in a spaced apart relationship with the computer monitor side 12. This hingeable attachment enables stabilization of the bracket body 174 as well as the bracket 19 to the monitor side 214. Additional adherent members 206 disposed below the bendable tab 176 provide additional adherence between the bracket 18 and a computer side 12, 20. A plurality of spaced apart ribs 212 disposed on one side of the bracket body 174 provide a means for engaging the outside grooves 72 of the frame 24.

The organizer 10 may be assembled on the monitor side 12 as follows: First a release layer not shown, are removed from the ends 190, 192, 202, 206 and the bracket pressed against the monitor side 12. The tab 190, 192 are then bent over the top and the bottom of the monitor 14 respectively and adhered thereto. The bracket body 174 is then adjusted to a perpendicular relationship with a monitor screen and a rear tab 196 is bent to extend between the body 174 and the monitor side 12 at which point the rear tab 202 is adhered to the computer monitor side 12.

Thereafter the frame 24 is installed on to the bracket 18 by engaging the ribs 212 to monitor side 12 with the outside grooves 72 of the frame 24. The decorative panels 76, 78 may then be slid into position. As hereinabove noted, the adaptor may be utilized to couple a plurality of frames 24 to one another with the decretive panels 76, 78 being the last outboard elements. Thereafter any combination of the modules 28, 44, 46, 48, 50, 100 may be inserted into the frame 24 along with the top module 32 to complete installation of the organizer 10 on to the computer monitor 14.

Although there has been hereinabove described an organizer apparatus in accordance with the present invention, for the purpose of illustrating the manner to which the invention may be used to advantage, it should be appreciated that the invention is not limited thereto. Accordingly, any and all embodiments, variations, or equivalent arrangements which may occur to those skilled in the art, should be considered to be within the scope of the present invention as defined in the appended claims.

What is claimed is:

1. An organizer for orientation of desk top items, said organizer comprising:
    a plurality of different sized modules; and
    a frame, having a front, back and two sides, for slideably and replaceably receiving said plurality of different-sized modules, the modules being positioned vertically within the frame between the two sides for enabling access to the modules from the frame front, one of the two sides of the frame being configured with at least one bracket for attachment alongside a generally vertical surface.

2. The organizer according to claim 1 wherein at least one module comprises a shelf.

3. The organizer according to claim 1 wherein at least one module comprises a slidable shelf.

4. The organizer according to claim 1 wherein the frame includes an open top and the organizer further comprising a module for insertion into the frame open top for supporting a cup.

5. The organizer according to claim 1 wherein at least one module comprises spaced apart slots for receiving CD cases or floppy disks.

6. The organizer according to claim 1 wherein at least one module comprises spaced apart slots for receiving CDs and grooves in bottoms of the slots for stabilizing the CDs within the slots.

7. The organizer according to claim 1 wherein the frame sides include parallel inside grooves for receiving the modules.

8. The organizer according to claim 7, wherein each of the replaceable, different-sized modules is configured to contain at least one of different-sized desk top items.

9. The organizer according to claim 8 wherein each of the modules includes biasing elements for stabling each module between the frame side inside groves.

10. The organizer according to claim 1 further comprising an opening in the frame for receiving and displaying a photograph.

11. The organizer according to claim 1 wherein at least one of the modules comprises:
    a front;
    at least one computer input receptacle disposed in said module and accessible from the module front; and
    means for connecting said input receptacle to a computer.

12. The organizer according to claim 1 where at least one of the modules comprises a speaker.

13. The organizer according to claim 1 wherein the frame sides include parallel outside grooves for receiving accent panels and the organizer further comprises at least one accent panel.

14. The organizer according to claim 13 further comprising a second frame, having a front, back and two sides, for receiving the modules, orienting the modules within the second frame between the two second frame sides and enabling access to the modules from the second frame front, the second frame sides include parallel outside grooves and the organizer further comprises a ribbed adapter for connecting the frame and second frame together by way of the outside grooves on the sides of the frame and second frame.

15. The organizer according to claim 13, further comprising a shelf, said shelf including ribs for engaging the parallel outside grooves to support the shelf in a generally horizontal position and extending outwards from the frame side.

16. The organizer according to claim 13 wherein a plurality of accent panels are inserted into the outside grooves.

17. The organizer according to claim 13 wherein at least one accent panel includes an opening therein for supporting pens or pencils.

18. The organizer according to claim 1 wherein a wire passageway is provided along the inside of the frame back.

19. An organizer for vertical orientation of desk top items, said organizer comprising:
    a frame having a front, back, left and right hand sides;
    a bracket for mounting said frame with one of the left and right hand frame sides abutting a vertical surface, the frame front being generally perpendicular to said vertical surface, said bracket comprising:
        a body having means for engaging the frame:
        a bendable tab extending from a top of said body for attaching said body to a top of the vertical surface;
        a rear tab, hingeably attached to a rear of said body, for attaching said body rear to a side of computer monitor, the hingeable attachment enabling stabilization of the body rear at a spaced apart relationship with the computer monitor side; and
    a plurality of modules configured for being removably inserted into said frame in an orientation enabling access to said modules from the front of said frame.

20. The organizer according to claim 19 wherein the bracket further comprises a second bendable tab extending from a bottom of said body for attaching said body to a bottom of the computer monitor.

21. The organizer according to claim 19 wherein said body is a flat elongate member and said means for engaging the frame compresses a plurality of spaced apart ribs along one side of said flat elongate member approximately perpendicular to a longitudinal axis of said flat elongate member.

22. The organizer according to claim 21 further comprising at least one adherent member, disposed below the said bendable tab on an opposite side of said flat elongate member for adhering said flat elongate member to said computer monitor.

23. The organizer according to claim 22 further comprising an adherent member, hingeable attached to the said rear tab at an end thereof opposite the hingeable attachment to the body rear, for adhering said rear tab to the computer monitor rear.

24. The organizer according to claim 19 wherein at least one module compromises a shelf.

25. The organizer according to claim 19 wherein at least one module comprises a slidable shelf.

26. The organizer according to claim 19 wherein the frame includes an open top and the organizer further comprises a module for insertion into the frame open top for supporting a cup.

27. The organizer according to claim 19 wherein at least one module comprises spaced apart slots for receiving CD cases or floppy disks.

28. The organizer according to claim 19 wherein at least one module comprises spaced apart slots for receiving CDs and grooves in bottom of the slots for stabilizing the CDs within the slots.

29. The organizer according to claim 19 wherein the frame sides include parallel inside grooves for receiving the modules.

30. The organizer according to claim 29 wherein each of the modules includes biasing elements for stabilizing each module between the frame side inside grooves.

31. The organizer according to claim 19 further comprising an opening in the frame front for receiving and displaying a photograph.

32. The organizer according to claim 19 wherein at least one of the modules comprises:
    a front; and
    at least one computer input receptacle disposed in said module and accessible from the module front;
    means for connecting said input receptacle to a computer.

33. The organizer according to claim 19 wherein at least one of the modules comprises a speaker.

34. The organizer according to claim 19 wherein a wire passageway is provided along an inside of the frame back.

35. An organizer for vertical orientation of desk top items, said organizer comprising:
    a frame having a front, back, left and right hand sides, the sides including parallel outside grooves;
    a bracket for mounting said frame with one of the left and right hand frame sides abutting a vertical surface, the frame front being generally perpendicular to said vertical surface;
    a plurality of modules configured for being removably inserted into said frame in an orientation enabling access to said modules from the front of said frame; and
    a shelf, said shelf including ribs for engaging the parallel outside grooves to support the shelf in a generally horizontal position and extending outwardly from one of the frame sides.

36. The organizer according to claim 35 wherein a plurality of accent panels are inserted into the outside grooves of one frame side.

37. The organizer according to claim 35 wherein at least one accent panel includes an opening therein for supporting pens or pencils.

38. The organizer according to claim 35 further comprising a second frame, having a front, back and two sides, for receiving the modules, orienting the modules within the second frame between the two second frame sides and enabling access to the modules from the second frame front, the second frame sides include parallel outside grooves, and the organizer further comprises a ribbed adapter for coupling the frame and second frame together by way of the outside grooves on the sides of the frame and second frame.

39. A bracket assembly for attaching an accessory to a computer monitor, said bracket assembly comprising:
    an elongate body having means for engaging the accessory;
    a bendable tab extending from a top of said body for attaching said body to a top of the computer monitor; and
    a rear tab, hingeably attached to a rear of said body, for attaching said body rear to a side of the computer monitor, the hingeable attachment enabling stabilization of the body rear at a spaced apart relationship with the computer monitor side.

40. The assembly according to claim 39 further comprising a second bendable tab extending from a bottom of said body for attaching said body to a bottom of the computer monitor.

41. The assembly according to claim 39 wherein said body is a flat elongate member and said means for engaging the accessory comprises a plurality of spaced apart ribs disposed along one side of said flat elongate member approximately perpendicular to a longitudinal axis of said flat elongate member.

42. The assembly according to claim 41 further comprising at least one adherent member, disposed below said bendable tab on an opposite side of said flat elongate member to said computer monitor.

43. The assembly according to claim 42 further comprising an adherent member, hingeably attached to said rear tab at an end thereof opposite the hingeable attachment to the body rear, for adhering said rear tab to the computer monitor rear.

44. The assembly according to claim 39 further comprising the accessory, the accessory comprising a frame, having a front, back and two sides, for receiving a plurality of modules, orienting the modules vertically within the frame between the two sides and enabling access to the modules from the frame front.

45. The assembly according to claim 44 wherein a wire passageway is provided along an inside of the frame back.

46. The assembly according to claim 44 further comprising at least one shelf module for insertion into the frame.

47. The assembly according to claim 44 wherein the frame includes at least one module comprising a slidable shelf.

48. The assembly according to claim 44 wherein the frame includes an open top and the assembly further comprises a top module for insertion into the frame open top for supporting a cup.

49. The assembly according to claim 44 wherein at least one module comprises spaced apart slots for receiving CD cases or floppy disks.

50. The assembly according to claim 44 wherein at least one module comprises spaced apart slots for receiving CDs and grooves in bottom of the slots for stabilizing the CDs within the slots.

51. The assembly according to claim 44 wherein the frame sides include parallel inside grooves for receiving the modules.

52. The assembly according to claim 51 wherein each of the modules includes biasing elements for stabilizing each module between the frame side inside grooves.

53. The assembly according to claim 44 further comprising an opening in the frame front for receiving and displaying a photograph.

54. The assembly according to claim 44 wherein at least one of the modules comprises:
   a front;
   at least one computer input receptacle disposed in said module and accessible from the module front.

55. The assembly according to claim 44 wherein at least one of the modules comprises a speaker.

56. The assembly according to claim 55 further comprising a shelf, said shelf includes ribs for engaging the parallel outside grooves to support the shelf in a generally outwardly horizontal position and extending outwardly from the frame side.

57. The assembly according to claim 44 wherein the frame sides include parallel outside grooves for receiving accent panels and the organizer further comprises at least one accent panel.

58. The assembly according to claim 57 further comprising a second frame, having a front, back and two sides, for receiving the modules, orienting the modules within the second frame between the two second frame sides and enabling access to the modules from the second frame front, the second, frame sides includes parallel outside grooves and the assembly further comprises a ribbed adapter for compiling the frame and second frame and second frame together by way of the outside grooves on the sides of the frame and second frame.

59. The assembly according to claim 57 wherein a plurality of accent panels are inserted into the outside grooves of one frame side.

60. The assembly according to claim 57 wherein at least one accent panel includes an opening therein for supporting pens or pencils.

61. A computer monitor accessory comprising:
   a module having a front:
      at least one computer input receptacle disposed in said module and accessible from the module front;
      means for connecting said input receptacle to a computer;
   a bracket for supporting the module alongside a computer monitor with the module front disposed in a plane generally parallel to a screen of the computer monitor, said bracket comprising:
      a body;
      a bendable tab extending from a top of said body for attaching said body to a top of the computer monitor; and
      a rear tab, hingeably attached to a rear of said body, for attaching said body rear to a side of the computer monitor, the hingeable attachment enabling stabilization the body rear in a spaced apart relationship with the computer monitor side; and
      a frame for removably receiving said module and interconnecting said module with said bracket.

62. The accessory according to claim 61 further comprising a second bendable tab extending from a bottom of said body for attaching said body to a bottom of the computer monitor.

63. The accessory according to claim 61 wherein said body is a flat elongate member and said means for engaging the accessory comprises a plurality of spaced apart ribs disposed along one side of said flat elongate member approximately perpendicular to a longitudinal axis of said flat elongate member.

64. The accessory according to claim 63 further comprising at least one adherent member, disposed below said flat elongate member for adhering said flat elongate member to said computer monitor.

65. The accessory according to claim 64 further comprising an adherent member, hingeably attached to the said rear tab at an end thereof opposite the hingeable attachment to the body rear, for adhering said rear tab to the computer monitor rear.

66. The accessory according to claim 61 wherein said frame includes a front, back and two sides, for receiving a plurality of modules, orienting the modules vertically within the frame between the two sides and enabling access to the module from the frame front.

67. The accessory according to claim 66 wherein at least one module comprises a shelf.

68. The accessory according to claim 66 wherein at least one module comprises a slidable shelf.

69. The accessory according to claim 66 wherein the frame includes an open top and the organizer further comprises a top module for insertion into the frame open top for supporting a cup.

70. The accessory according to claim 66 wherein at least one module comprises spaced apart slots for receiving CD cases or floppy disks.

71. The accessory according to claim 66 wherein at least one module comprises spaced apart slots for receiving CDs and grooves in the bottom of the slots for stabilizing the CDs within the slots.

72. The accessory to claim 66 wherein the frame sides include parallel inside grooves for receiving the modules.

73. The accessory according to claim 72 wherein each of the modules include biasing elements for stabilizing each module between the frame side inside grooves.

74. The accessory according to claim 66 further comprising an opening in the frame front for receiving and displaying a photograph.

75. The accessory according to claim 66 wherein a least one of the modules comprises a speaker.

76. The accessory according to claim 66 wherein the frame sides include parallel outside grooves for receiving accent panels and the accessory further comprises at least one accent panel.

77. The accessory according to claim 76 further comprising a shelf, said shelf includes rib for engaging the parallel outside groove to support the shelf in a generally horizontal position end extending outwardly from the frame side.

78. The accessory according to claim 76 wherein plurality of accent panels are inserted into the outside grooves of one front side.

79. The accessory according to claim 76 wherein at least one accent panel includes opening therein for supporting pens or pencils.

80. The accessory according to claim 67 wherein wire passageway is provided along an inside of the frame back.

81. The accessory according to claim 66 further comprising a second frame, having a front, back and two sides, for receiving the modules, orienting the modules within the second frame between the two second frame sides and enabling access to the modules from the second frame front, the second frame sides include parallel outside grooves and the accessory further comprises a ribbed adaptor for coupling the frame and second frame together by way of the outside groves on the sides of the frame and second frame.

* * * * *

UNITED STATES PATENT AND TRADEMARK OFFICE
CERTIFICATE OF CORRECTION

PATENT NO. : 6,412,889 B1
APPLICATION NO. : 09/538251
DATED : July 2, 2002
INVENTOR(S) : Mike Hummell et al.

Figure 17:
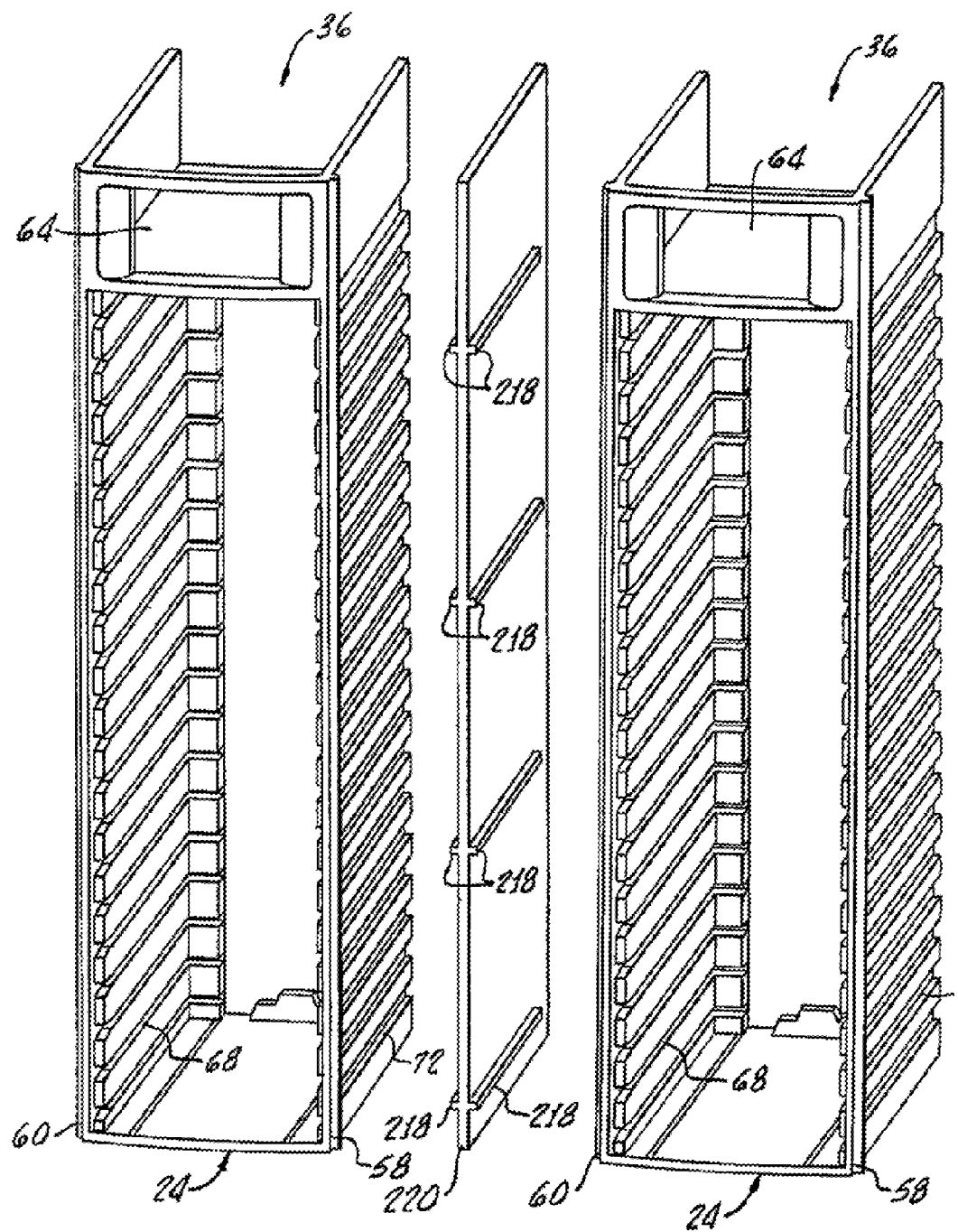

It is certified that error appears in the above-identified patent and that said Letters Patent is hereby corrected as shown below:

In the drawings, please add Figure 17 on attached hereto.

Column 4 at line 47 insert the paragraph:

Figure 17 is a perspective view of a pair of frames along with a coupling element for attaching the frames in a side-by-side relationship to the computer monitor Column 6, at line 52 insert the following paragraph:

Figure 17 illustrates a plurality of frames 24, which may be identical in configuration along with an adapter 220 having ribs 218 for coupling two frames 24 together by way of the outside grooves 72 on the sides 52, 60 of the frames 24. Accordingly, multiple frames may be attached to one another on both sides of the monitor for expanding the capability for storing of various items of interest to the user.

Signed and Sealed this

Tenth Day of July, 2007

JON W. DUDAS
*Director of the United States Patent and Trademark Office*